June 8, 1926.

W. HAHNEMANN ET AL 1,588,358

SOUND RECEIVING EQUIPMENT FOR SHIPS

Filed May 26, 1921     2 Sheets-Sheet 1

Inventors
Walter Hahnemann and
Wilhelm Rudolph
by Knight Bros attorneys

Patented June 8, 1926.

1,588,358

UNITED STATES PATENT OFFICE.

WALTER HAHNEMANN, OF KITZEBERG, NEAR KIEL, AND WILHELM RUDOLPH, OF KIEL, GERMANY, ASSIGNORS TO THE FIRM SIGNAL GESELLSCHAFT M. B. H., OF KIEL, GERMANY.

SOUND-RECEIVING EQUIPMENT FOR SHIPS.

Application filed May 26, 1921, Serial No. 472,941, and in Germany May 31, 1920.

The invention relates to an equipment on ships for determining the direction of sound. It consists in the combination of the well-known sound shadow method, which is practised with receivers arranged one on the port and one on the starboard, with the binaural method, also well-known in itself, whereby for the mere estimation of direction (port or starboard side) the first-mentioned method is used while for the exact determination of the direction the second method is used. According to the invention there is provided on board a pair of receivers with one receiver on the port and the other on the starboard side, and in addition on each side of the ship there is again a pair of receivers forming a so-called base, all of which receivers are connected with the observing station in such a way that the receivers of the first pair can be used for comparing the loudness and the receivers of the last-mentioned pair for the binaural determination of direction. Of course, one receiver of each of the base pairs may be used as receiver of the first pair on the port and starboard so that four receivers in all suffice.

The single or singly connected starboard and port receivers serve merely for ascertaining roughly the position of the source of sound to be determined relatively to the longitudinal axis of the ship, while the base pairs are used for exact angular determination.

In Figs. 1–5 constructional examples of the invention are represented in which—

Figure 1:
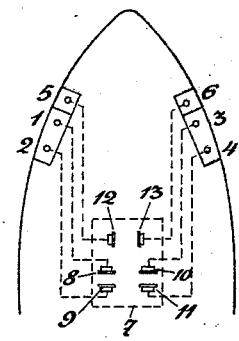
Fig. 1 shows an equipment comprising a pair of receivers for the shadow method and a pair of receivers both on the port and starboard for the binaural method.
Figure 2:
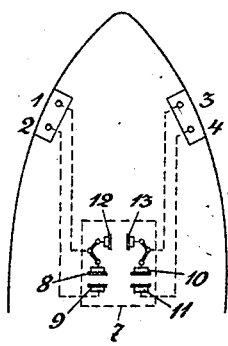
Fig. 2 shows an equipment in which a receiver of each receiving base can be used for the shadow method.

In Fig. 1, 1 and 2 indicate the receivers of the one receiving base, 3 and 4 the receivers of the other receiving base, while 5 and 6 are the receivers intended for the shadow method. All the receivers are connected by conductors with the central station 7 in such a way that each receiver is connected to a telephone or ear piece associated with it. The telephones or ear pieces are according to this embodiment of the invention so associated with one another that 8 and 9 belong to the bases 1 and 2, 10 and 11 belong to the bases 3 and 4, whereas 12 and 13 belong to the pair of receivers for the shadow method.

In Fig. 2 corresponding elements are correspondingly indicated. In this case only four receivers are provided; but the arrangement is such that the receivers 1 and 3 may be applied at will to the telephones 8, 10, or 12, 13.

Figure 3:
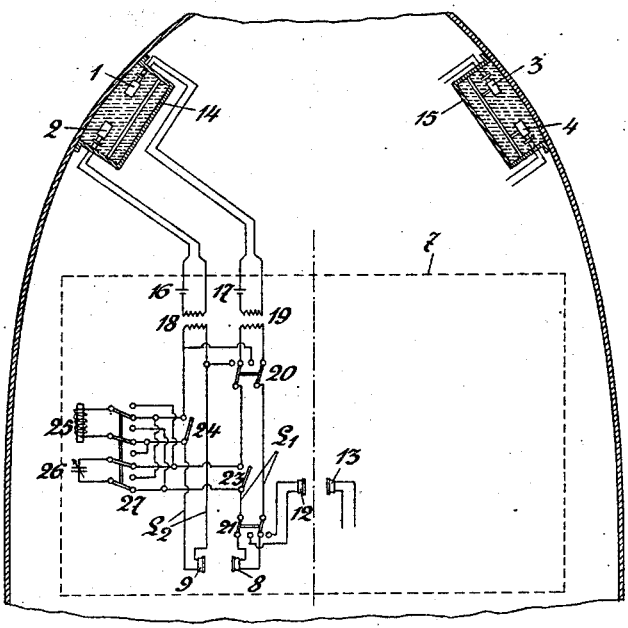
Fig. 3 shows an arrangement with four receivers in which each of the two receivers of each receiving base can be used for the shadow method.
Figure 4:
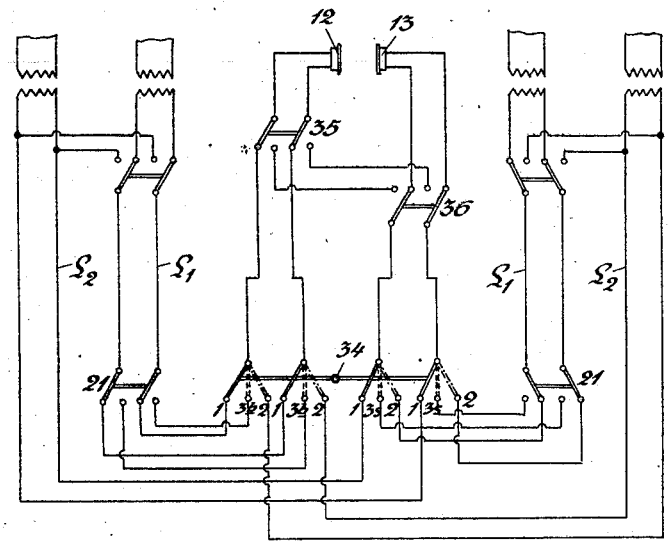
Fig. 4 shows an arrangement similar to Fig. 3 in which however only two listening devices are required.

The arrangement of Fig. 3 is in its main essentials the same as that shown in Fig. 2. Receiving casings with microphones 1, 2, and 3, 4 are arranged inside the ship in water containers 14, 15 in the correct spacing from one another so that they can be used for the binaural determination of direction. The circuit arrangement which connects the receivers with the central station 7 is symmetrical to the axis of the ship and the same for both sides. As an example, the left side only is represented. The microphones in the casings are fed with current by the batteries 16, 17. The alternating current induced during reception flows through transformers 18, 19 into the conductors $L_1$, $L_2$ leading to the telephones 8, 9 and 12. The switch 20 permits the receivers 1, 2 to be connected at will to the same conductor $L_1$ in which a further switch 21 again allows this particular conductor to be applied as desired either to the telephone 8 or the telephone 12. In this way the possibility is provided that either of the two receivers of the receiving base can be used for estimating direction according to the shadow method. The single pole single throw switches 23 and 24 must in this case of course be closed. If however the switch 20 is brought to the right and the switch 21 brought to the left then the equipment can be used for direction determination by estimating the angle. In order to be able to use the equipment also for exact determination of direction according to the binaural method and with the aid of delaying devices for equalizing the time difference at which the same sound wave impinges on the two receivers, a variable self induction coil 25 and a condenser 26, also variable if desired, are provided which, with the aid of the four pole double throw switch 27 can be connected in the conductors between receiver 2 and telephone 9 and between receiver 1 and telephone 8 respectively or can be interchanged between them as desired. In the same way as four receivers can be made to suffice, the arrangement at the observing station may be such that only four, or in certain cases actually only two, telephones are used if they are connected with a switching device so that they may be connected at will on the port-starboard pair and on each of the two bases. Such a modification of Fig. 3 is shown in Fig. 4.

In this modification the conductors $L_1$ and $L_2$ are brought to a common switch 34 which is provided with four switching levers and possesses at the same time four contact studs 1, 2 as well as two contact studs $3^b$ and $3^s$. To the contact studs 1, the conductors $L_1$ and $L_2$ of the port side are connected, the former through the switch 21; while to the contact studs 2 are connected the conductors $L_1$, $L_2$ of the starboard side, the former again through the switch 21. To the contact studs $3^b$ is connected further the switch 21 of the conductor $L_1$ on the port, while on the starboard side the same conductor is connected to the contact studs $3^s$. The conductors leading to the listening devices 12, 13 are connected with the switch levers and an additional switch 35, 36 is connected in each of these conductors. These switches make it possible to hear individual receivers at will in succession on the same ear, for example, a port receiver and a starboard receiver. Otherwise the method of connection is the same as represented in Fig. 3.

Figure 5:
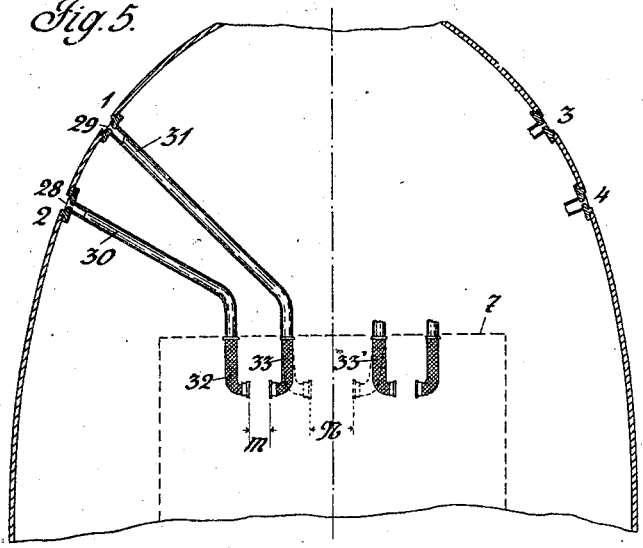
Fig. 5 shows an arrangement in the manner of Fig. 3 but with tubular sound conductors in place of the electrical receiving equipment.

The equipment of Fig. 5 is to be assumed symmetrical like that of Fig. 3 and therefore only the one side of the ship is drawn in detail. In Fig. 5 the receivers 1, 2 or 3, 4 are constructed as so-called air receivers, that is to say, diaphragms 28 and 29 are inserted in the wall of the ship in order to take up the sound vibrations from the water and impart them to the air in the tubular sound conductors 30, 31. These conductors are led to the central station 7 and provided here with ear pieces 32, 33. One of the ear pieces 33 is movably arranged so that it can be used together with the corresponding one of the other side ($33^1$) for receiving the sound direction according to the shadow method, while in the normal position the distance between 32 and 33 ($m$) must correspond approximately to the distance between the human ears. The distance (N) between 33 and $33^1$ in the position indicated in dotted lines is preferably taken somewhat greater than $m$ in order that each of the two receivers connected to the ear pieces can be heard by itself separately.

By means of retarding devices also interference methods may serve for ascertaining the direction of sound especially in the case of sound to be received which has a definite wave form, i. e. in the case of pure tones. If the position of the retarding devices is such that in one of the ear pieces (32) of one pair of receivers (29, 28) a maximum amplitude of wave corresponds at the same time to a minimum amplitude of wave in the other ear piece (33) the sound impression in the ears of the observer is minimum or entirely zero. The occurrence of this minimum proves that the time interval, by which the sound wave reaching one receiver of one pair (28, 29) lags, is equalled by lengthening the retarding device in the conducting tube or leading tube of the other receiver. The position of the retarding device in one of the sound leading tubes compared with the position of the corresponding retarding device in the other leading tube of the same pair shows the amount of this time interval and also by means of a simple calculation the direction of the sound received. The exactitude of this method is about the same as the exactitude of the previously mentioned binaural or direction impression method.

While with only one receiver one on the port and one on the starboard, using, for example, the shadow method, it is not possible without turning the ship particularly with a source of sound located far to the side, to find exactly the sound direction, it is possible with the arrangement according to the invention to ascertain with the receiving bases very exactly at what angle the source of sound lies ahead or astern. The direction determination with the arrangement of receivers described is at once decisive and is to be preferred.

We claim:

1. In submarine sound direction finding apparatus, a vessel, a plurality of sound receivers on each side of the vessel, means whereby an observer may listen to a receiver on each side of the vessel to determine the general direction of the sound source by the shadow method, and means whereby an observer may selectively listen to a pair of receivers on either side of the vessel to determine the specific direction of the sound source by the base method.

2. In submarine sound direction finding apparatus, a vessel, a plurality of sound receivers on each side of the vessel, ear pieces, means for connecting a receiver on each side of the vessel with an individual ear piece to determine the general direction of the sound source by the shadow method, and means for selectively connecting a pair of receivers on either side individually to a pair of ear pieces to determine the specific direction of the sound source by the base method.

3. Sound receiving equipment for determining on ships the direction of sound waves, comprising sound wave receivers on the port and starboard sides of a ship, listening devices, means for connecting a receiver on the port side and a receiver on the starboard side to the listening devices for the determination of the direction of sounds by the shadow method, and means for connecting selectively a pair of receivers located on the port or a pair of receivers located on the starboard side to the said listening devices for the determination of the direction of sounds by the base method.

4. Sound receiving equipment for determining on ships the direction of sound waves, comprising a pair of sound wave receivers both on the port and the starboard sides of a ship, and a pair of listening devices, the pairs of receivers being adapted to be selectively connected to the listening devices and used for determining the direction of sounds by the base method, and one receiver of one pair of receivers being adapted to be connected to the listening devices together with one receiver of the other pair for the determination of the direction of sounds by the shadow method.

5. Sound receiving equipment for determining on ships the direction of sound waves, comprising a pair of electrically operated sound wave receivers arranged both on the port and the starboard sides of a ship, three pairs of telephones, and means for connecting at will either one pair of receivers to a corresponding pair of telephones for sound direction determination by the base method, or one receiver of each pair to the third pair of telephones for sound direction determination by the shadow method.

6. Sound receiving equipment for determining on ships the direction of sound waves, comprising a pair of sound wave receivers both on the port and the starboard sides of a ship, a pair of listening devices corresponding to each of said pairs of receivers, and a pair of sound tubes connecting each pair of receivers to its corresponding pair of listening devices, each said pair of listening devices being adapted to be used for determining the direction of sounds by the base method, and one listening device of one pair of listening devices being adapted to be used in conjunction with one listening device of the other pair for the determination of the direction of sounds by the shadow method.

7. Sound receiving equipment for determining on ships the direction of sound waves, comprising a pair of sound receivers both on the port side and the starboard side of a ship, a pair of listening devices, and means for selectively connecting either of the said pairs of receivers to the pair of listening devices for sound direction determination by the base method, and for connecting one receiver of each of said pairs to the pair of listening devices for sound direction determination by the shadow method.

8. Sound receiving equipment for determining on ships the direction of sound waves, comprising a pair of sound receivers both on the port side and the starboard side of a ship, a pair of telephones, and means for selectively connecting either of the said pairs of receivers to the pair of telephones for sound direction determination by the base method, and for connecting one receiver of each said pairs to the pair of telephones for sound direction determination by the shadow method.

9. Sound receiving equipment for determining on ships the direction of sound waves, comprising a pair of sound receivers both on the port side and the starboard side of a ship, a pair of listening devices, means for connecting the receivers to the listening devices, and a switching device for switching the listening devices at will into connection with the port pair of receivers or the starboard pair of receivers for the sound direction determination by the base method, and, for the sound direction determination, by the shadow method, into connection with a receiver of each of these pairs.

In testimony whereof we affix our signatures.

WALTER HAHNEMANN.
WILHELM RUDOLPH.